United States Patent [19]

Pace et al.

[11] Patent Number: 4,507,142

[45] Date of Patent: Mar. 26, 1985

[54] ALPHA-OXIMINO ALKANOIC ACID CONTAINING FOLIAR FERTILIZERS TO INCREASE YIELD OF CROP PLANTS

[75] Inventors: Gary M. Pace, Marcellus; James W. Friedrich, Cortland, both of N.Y.

[73] Assignee: Arcadian Corporation, Inc., Parsippany, N.J.

[21] Appl. No.: 454,797

[22] Filed: Dec. 30, 1982

[51] Int. Cl.³ .............................................. C05C 9/00
[52] U.S. Cl. .......................................... 71/83; 71/29; 71/65; 71/84; 71/90; 71/92; 71/94; 71/106; 71/113; 71/118
[58] Field of Search ................ 71/29, 65, 83, 84, 113, 71/106, 118, 90, 92, 94

[56] References Cited

U.S. PATENT DOCUMENTS

| | | | |
|---|---|---|---|
| 2,869,996 | 1/1959 | Vierling | 71/29 |
| 3,024,098 | 3/1962 | Austin et al. | 71/29 |
| 3,640,698 | 2/1972 | Backlund | 71/29 |
| 3,873,301 | 3/1975 | O'Brien et al. | 71/113 |
| 3,923,491 | 12/1975 | O'Brien et al. | 71/113 |
| 4,038,064 | 7/1977 | Clapp et al. | 71/29 |
| 4,146,383 | 3/1979 | Hanway et al. | 71/29 |
| 4,175,943 | 11/1979 | Jordaan et al. | 71/29 |

FOREIGN PATENT DOCUMENTS

| | | | |
|---|---|---|---|
| 157166 | 12/1975 | Japan | 71/113 |
| 591951 | 9/1947 | United Kingdom | 71/83 |
| 703307 | 2/1954 | United Kingdom | 71/84 |
| 571482 | 10/1977 | U.S.S.R. | 71/113 |

*Primary Examiner*—Richard L. Raymond
*Attorney, Agent, or Firm*—William T. Hough

[57] ABSTRACT

A composition and method for enhancing the yield of field crops by incorporating one or more alpha-oximino alkanoic acid compounds or derivatives thereof in a foliar fertilizer composition containing one or more sources of nitrogen and optionally one or more additional macronutrients and/or micronutrients and applying same to the foliage of said crops.

28 Claims, No Drawings

ALPHA-OXIMINO ALKANOIC ACID CONTAINING FOLIAR FERTILIZERS TO INCREASE YIELD OF CROP PLANTS

BACKGROUND OF THE INVENTION

1. Field of the Invention

This invention relates to a unique foliar fertilizer formulation and method of applying same to field crops, particularly legume crops such as soybean, and cereal grain crops, such as corn (maize). More particularly, this invention relates to foliar fertilizer formulations and methods which provide outstanding increases in yield of field crops.

2. Prior Art

It is known that various alpha-oximino alkanoic acid derivatives are plant growth regulators and can be applied to plants to increase crop yield. For example, U.S. Pat. Nos. 3,873,301 and 4,017,301 describe the use of various nitro-alpha-oximino alkanoic acid derivative for increasing crop yield, and U.S Pat. No. 3,923,491 describes the use of other derivatized alpha-oximino alkanoic acid compounds for increasing crop yield. It is recognized by those skilled in the art that plant growth regulator formulations have inconsistent effects on crop yield. This inconsistency can be attributed to environmental, developmental, and genetic effects as well as other unidentified factors.

In foliar feeding of plants nutrients, the nutrients are dissolved in water and the aqueous solution is sprayed on the leaves of the plants. U.S. Pat. No. 3,087,806 describes a method for improving the yield of soybeans by spraying the plants periodically throughout their growth with an aqueous solution of urea phosphate. The patent recommends twice weekly applications, and in an example such twice weekly sprayings were carried out for a period of 18 weeks.

U.S. Pat. No. 3,558,300 describes a method for foliar feeding of field crops, including soybeans and cereal grains, with an aqueous solution of an ammonium polyphosphate. Adequate ground fertilizer is employed in conjunction with the foliar feeding. It is claimed that the method improves the stress resistance of the plants. The ammonium polyphosphate solution is described as being applied during the crop growth period up to the flowering period.

U.S. Pat. No. 4,038,064 describes a foliar fertilizer composition containing water, urea, potassium, sulfur, phosphorus in the form of linear polyphosphates, and micronutrients, such as sulfur, boron, zinc, iron, manganese and copper. The patent also describes a process of improving soybean plant yields by applying the composition of the foliage of the soybean plant. The patent states that the composition must be applied during the period from shortly before flowering to shortly after the beginning of seed fill.

U.S. Pat. No. 4,146,383 describes a method for improving the yield of legume field crops and cereal grain crops by applying a foliar fertilizer composition containing sources of nitrogen, phosphorus, potassium and sulfur to the foliage of the crops during the seed filling period. The patent specifies that prior to the seed filling period, nutrients are supplied to the growing legume and cereal crops exclusively from the soil.

U.S. Pat. No. 4,033,146 describes a method of fertilizing conifer forests with nitrogen containing compounds by direct aerial application to the conifer foliage of an aqueous solution containing a nitrogen source, such as urea, ammonia, and nitrates of ammonium, calcium and potassium; ammonium phosphates and sulfates; or combinations thereof. The patent states that other micronutrients including iron, manganese, copper and zinc can be added to the solution.

U.S. Pat. No. 4,033,747 discloses a method of fertilizing conifer forest by direct application to the foliage of the conifers a solution containing a water-soluble nitrogen source. The patent also states that the solution may include sources of calcium, potassium, phosphorus, sulfur and minor trace metal nutrients such as iron, cobalt, molybdenum, manganese, copper, boron, zinc, magnesium and mixtures thereof.

It has been reported that mixed results have been achieved with foliar fertilization of crops, especially field crops and more particularly soybeans. While some tests suggested that yield improvements could be achieved, others suggested that no improvements at all were realized from foliar application of nitrogen-phosphorus-potassium (N-P-K) solutions. The January, 1969 issue of *World Farming* contains a more complete dissertation of the benefits of N-P-K foliar fertilization and the limits of application level beyond which leaf scorch occurs. Another article reprinted from *Ohio Farm and Home Research,* Vol. 41, No. 302, September-October, 1956, reports no benefit from foliar application of N-P-K solutions.

Unsuccessful attempts to increase yield by foliar fertilization have been reported by Mederski and Volk for wheat, corn, soybeans, oats and alfalfa. When the field crops were grown in soils with adequate fertility they failed to respond positively to foliar sprays containing N, P, and K. (Mederski, H. J. and Volk, G. W. "Foliar Fertilization of Field Crops", *Ohio Agr. Exp. Sta. Research Cir* 35, August 1956). It has been generally assumed that legume and cereal grain crops which have adequate soil fertilization will not produce significantly higher yeilds of the grain by supplemental foliar fertilization, although it has been recognized that the nutrients in the spray are absorbed by the leaves of the plants.

It was speculated that the adverse results were due to varying environmental factors, soil fertilizes and especially to the inability to apply more than small quantities of foliar fertilizers without damaging plant tissue, especially foliage. Several methods have been proposed for obviating the burning or plasmolysis effects of foliar application of fertilizers. For example, U.S. Pat. Nos. 4,318,729, 3,677,746, and 4,033,745 teach the use of urea formaldehyde polymers to obviate the burning problem by controlled slow release of the nitrogen over an extended period of time. However, these compositions also suffer from several disadvantages. For example, certain of these compositions release nitrogen at such a reduced rate that the growth of the plant and crop yield are not affected to any appreciable extent, and significant amounts of nitrogen remain unreleased at the end of the growing season and is lost.

SUMMARY OF THE INVENTION

The present invention is based on the discovery that inclusion of one or more alpha-oximinoalkanoic acids in aqueous fertilizers containing one or more sources of nitrogen, especially urea, and optionally, other macronutrients and micronutrients such as phosphorus, sulfur, potassium and the like has a pronounced effect on plant yield. Therefore, in accordance with this invention there is provided an improved foliar fertilizer composition of the type containing one or more sources of nitrogen and optionally, one or more sources of potassium, one or more sources of phosphorus, one or more sources of sulfur and/or one or more sources of other plant micronutrients, said improvement comprising a "synergistically effective amount" of one of more alpha-oximino alkanoic acid compounds of the formula:

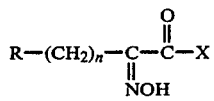

and ester, amide, sulfamide and salt derivatives thereof wherein:
N is an integer from 1 to about 12;
R is hydrogen, alkyl, nitro, cycloalkyl, alkaryl, aralkyl, aryl, hetrocyclic, alkenyl or alkynyl; and
X is —OZ, —SZ, —NZZ' or —OZ", wherein:
  O is divalent oxygen;
  S is divalent sulfur;
  N is alkali metal;
  Z and Z' are the same or different and are individually hydrogen, alkyl, cycloalkenyl, cycloalkyl, aralkyl, alkaryl, aryl, heterocyclic, alkynyl or alkenyl; and
  Z" is an alkali metal.

This invention also provides a method of enhancing the utilization of foliarly applied nitrogen by plants by applying the composition of this invention to the foliage of such plants.

DESCRIPTION OF THE PREFERRED EMBODIMENTS

One essential ingredient of the composition of this invention is a "synergistically effective amount" of one or more alpha-oximino alkanoic acids or derivatives thereof. As used herein, a "synergistically effective amount" is an amount of such alpha-oximino alkanoic acids which is sufficient to enhance the utilization of the fertilizer nutrients which are applied to the foliage of plants in combination with such acids to any extent. A result of the enhanced utilization is an increase in yield. Usually, an acceptable synergistic enhancement in yield will be achieved if the composition contains at least about 0.01 weight percent of one or more alpha-oximino alkanoic acids and/or derivatives thereof based on the total weight of the composition. In the preferred embodiments of the invention, the amount of such acids contained in the composition will vary from about 0.01 to about 10 weight percent based on the total weight of the composition, and in the particularly preferred embodiments will vary from about 0.05 to about 2.0 weight percent on the same basis. Amongst these particularly preferred embodiments of the invention most preferred are those in which the weight percent of such acids may vary from about 0.1 to about 1.0 on the above described basis.

Alpha-oximino alkanoic acids which are useful in the practice of this invention as those of the formula:

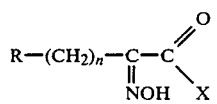

and ester, sulfamide, amide and salt derivatives thereof, wherein:
n is an integer from 1 to 12;
R is selected from the group consisting of hydrogen, alkyl, nitro, cycloalkyl, aralkyl, alkaryl, aryl, heterocyclic, alkenyl and alkynyl; and
X is selected from the group consisting of OZ, SZ, NZZ' and OZ", wherein:
  Z and Z' are the same or different and are independently selected from the group consisting of hydrogen, alkyl, cycloalky, cycloalkenyl, aralkyl, alkaryl, aryl, heterocyclic, alkenyl and alkynyl; and
  Z" is an alkali metal.

Such useful alpha-oximino alkanoic acid compounds and their ester, sulfamide, amide and salt derivatives are hereinafter collectively referred to as alpha-oximino alkanoic acid compounds.

The alkyl group generally contains from 1 to about 12 carbon atoms and preferably contains from 1 to 5 carbon atoms. Examples of such alkyl groups are methyl, isobutyl, pentyl, dodecyl and the like. The cycloalkyl and cycloalkenyl groups generally contain from about 3 to abut 12 carbon atoms and preferably contain from about 3 to about 6 carbon atoms. Illustrative of such cycloalkyl and cycloalkenyl groups are cyclobutyl, cyclohexyl, cyclohexenyl, cyclopentyl, cyclopentenyl and cyclooctyl. The aralkyl group generally consists of phenyl groups or alkyl substituted phenyl wherein the alkyl substituent includes from 1 to about 12 carbon atoms and preferably from 1 to about 6 carbon atoms. Examples of such aralkyl groups are benzyl, o-ethylbenzyl, 5-phenylpentyl, 6-phenyldodecyl and the like. The alkaryl group generally consists of phenyl or tolyl as the aryl group and alkyl having 1 to about 12 carbon atoms and preferably from 1 to about 6 carbon atoms as the alkyl group. Examples of such alkaryl groups are tolyl, o-ethyltolyl, m-hexyltolyl, and the like. Illustrative of useful heterocyclic groups are thienyl, pyridyl, piperidyl, pyrimidyl and the like.

The alkenyl group generally contains from about 3 to about 12 carbon atoms and preferably contains from about 3 to about 5 carbon atoms. Examples of such alkenyl groups are propenyl, butenyl, decenyl, octenyl, hexenyl and the like. The alkynyl group generally contains from about 3 to about 12 carbon atoms and preferably frm 3 to 6 carbon atoms. Examples of such alkynyl groups are propynyl, hexynyl, decynyl and the like.

Examples of useful plant growth regulants which can be used in the practice of the present invention wherein R is selected from the group consisiting of hydrogen, alkyl, cycloalkyl, aralkyl, alkaryl, aryl, heterocyclic, alkenyl and alkynyl and wherein X is selected from the group consisting of OZ, SZ and NZZ' in which Z and Z' are as defined above are as follows: octyl 2-oximinododecanoate, dodecyl 2-oximinodecanoate, octyl 6-cyclobutyl-2-oximinohexanoate, cyclohexyl 6-cyclohexyl-2-oximinohexanoate, cyclooctyl 12-phenyl-2-oximinododecanoate, benzyl 6-phenyl-2-oximinohexanamide, benzyl 12-(m-tolyl)-2-oximinododecanoate, m-tolyl 8-(o-ethylbenzyl)-2-oximinooctanoate, phenyl 5-(2-thienyl)-2-oximinopentanoate, m-tolyl 3-(2-pyridyl)-2-oximinopropanoate, o-ethylbenzyl 4-(2-propynyl)-2-oximinobutanoate, m-isobutylbenzyl 10-(2-propenyl)-2-oximinodecanoate, 2-thienyl 6-(2-hexynyl)-2-oximinohexanoate, 2-pyridyl 12-(2'-hexenyl)-2-oximinododecanoate, N-piperidyl 11-phenyl-2-oximinoundecanoate, 2-propenyl 6-phenyl-2- oximinohexanoate, 2-decenyl 8-(n-phenyl-pentyl)-2-oximinooctanoate, 2-butenyl 2-oximinoheptanoate, 2-propynyl 2-oximinohexanoate, 2-decnyl 10-(m-isobutylbenzyl)-2-oximinodecanoate, 2-hexynyl 12-phenyl-2-oximinododecanoate, 2-oximinopentanoic acid, 5-methyl-2-oximinohexanoic acid, 2-propynl 2-oximinopentanoate, N,N-dibutyl 6-methyl-2-oximinoheptanamide, N-cyclohexyl 2-oximinobutanamide, N-piperidino 2 oxiiminopentanamide, N-ethyl, N-(m-tolyl)-2-oximinodecanamide, 2-oximinohexanoic acid, phenyl 7-(m-tolyl)-2-oximinothioheptanoate, 2-oximinopentanoic acid and ethyl 10-(2-butenyl)-2-oximinthiodecanoate, alkaryl, aryl, heterocyclic, alkenyl or alkynyl are octyl 12-nitro-2-oximinododecanoate, dodecyl 10-nitro-2-oximinodecanoate, octyl 6-nitro-2-oximinohexanoate, cyclohexyl 6-nitro-2-oximinohexanoate, cyclooctyl 10-nitro-2-oximinodecanoate, benzyl 6-nitro-2-oximinohexanoate, benzyl 12-nitro-2-oximinododecanoate m-cresyl 8-nitro-2-oximinooctnoate, phenyl 5-nitro-2-oximinopentanoate, m-tolyl 3-nitro-2-oximinopropanoate, o-etheylbenzel 4-nitro-2-oximinobutanoate, m-isobutylbenzyl 10-nitro-2-oximinodecanoate, 2-thienyl 6-nitro-2-oximinohexanoate, 2-pyridyl 12-nitro-2-oximinododecanoate, 2-pyridyl 11-nitro-2-oximinoundecanoate, 2-propenyl 6-nitro-2-oximinohexanoate, 2-decenyl 8-nitro-2-oximinoocatanoate, 1-butenyl 7-nitro-2-oximinoheptanoate, 2-propynyl 6-nitro-2-oximinodecanoate, 2-hexenyl 12-nitro-2-oximinododecanoate, methyl 6-nitro-2-oximinohexanoate, ethyl 6-nitro-2-oximinohexanoate, 6-nitro-2-oximinohexanoic acid, 10-nitro-2-oximinodecanoic acid, pentyl 8-nitro-2-oximinothiooctanoate m-tolyl 4-nitro-2-oximinothiobutanoate, N-ethyl 6-nitro-2-oximinohexanamide, N-decyl 12-nitro-2-oximinodecanamide, N-cyclohexyl 3-nitro-2-oximinopropanamide, N-benzyl 6-nitro-2-oximinohexanamide, N-(m-tolyl) 5-nitro-2-oximinopentanamide, N-(2-thienyl) 7-nitro-2-oximinoheptanamide, N-(2-decenyl) 8-nitro-2-oximinooctanamide, N-(2-hexynyl) 12-nitro-2-oximodecanamide, N,N-diethyl 6-nitro-2-oximinohexanamide, N,N-dibenzyl 8-nitro-2-oximinooctanamide, N,Ndi(m-N,Ndi(m-thienyl) 10-nitro-2-oximinodecanamide, 8-nitro-2-oximinooctanamide and 6-nitro-2-oximinohexanamide.

Examples of nitro-oximino alkanoic acid derivatives when Y in the general formula is OZ" are sodium 6-nitro-2-oximinohexanoate, potassium 10-nitro-2-oximinodecanoate, lithium 7-nitro-2-oximinoheptanoate, sodium 7-cyclobutyl-2-oximinoheptanoate, potassium 9-isobutyl-2-oximinooctanoate and lithium 3-cyclohexyl-2-oximinopropanoate and the like.

Alpha-oximino alkanoic acids and derivatives thereof which are especially preferred are methyl 6-nitro-2-oximinohexanoate, ethyl 6-nitro-2-oximinohexanoate, 6-nitro-2-oximinohexanamide, 6-nitro-2-oximinohexanoic acid and alpha-oximinohexanoic acid. Among these especially preferred alpha-oximino alkanoic acids and derivatives, most preferred is 2-oximinohexanoic acid.

Alpha-oximino alkanoic acids which are useful in the conduct of the present invention are known and may be prepared by conventional means. For example, 2-oximinohexanoic acid may be prepared by reacting n-butyl nitrite and dry hydrogen chloride with n-butylmalonic acid as described in R. H. Barry and W. H. Harting, 12 *J. Org. Chem.*, 460 (1947). Similarly, ethyl 6-nitro-2-oximinohexanoate which is disclosed in Sayles and Degering, "New Synthetic Methods For the Preparation of Lysine", *J. Amer. Chem. Soc.*, 3161, 3162–3163, (1949) may be prepared by the reaction of ethyl 2-acetyl-6-nitrohexanoate with n-butyl nitrite; 6-nitro-2-oximinohexanamide can be prepared by the reaction of 2-nitro-6-oximinocyclohexanone with anhydrous ammonia as disclosed in U.S. patent application Ser. No. 97,290 filed Dec. 11, 1970 by Fuhrmann et al., entitled: "Ammonolysis of 2-nitro-6-oximino cyclohexanone;" and 6-nitro-2-oximinohexanoic acid can be prepared as describe in B. F. Burrows and W. B. Turner, *J. Chem. Soc.* (C) 255,259 (1969).

As a second essential ingredient, the composition of this invention includes one or more sources of nitrogen. Illustrative of useful nitrogen sources are urea, ammonia, and ammonium and nitrate compounds, such as ammonium nitrate, potassium nitrate, ammonium sulfate, calcium nitrate, ammonium phosphate, ammonium polyphosphate and the like. Other useful sources of nitrogen include water-soluble urea and formaldehyde condensation products such as methyolurea, methyleneureas and mixtures thereof. Illustrative of such useful water-soluble urea and formaldehyde condensation products are those whose preparation and use are described in detail in Justice U.S. Pat. No. 3,462,256. Still other useful nitrogen sources include water-insoluble urea and formaldehyde condensation products such as ureaform. Illustrative of useful water-insoluble urea and formaldehyde condensation products are the compounds whose preparation and use are described in detail in Formaini U.S. Pat. No. 3,677,736 and Moore U.S. Pat. No. 4,033,745. Water-soluble nitrogen sources are preferred for use in the practice of the invention, and ammonia, urea, ammonium nitrate, water-soluble urea and formaldehyde condensation products are particularly preferred. Amongst these particularly preferred polymers, urea and water-soluble urea and formaldehyde condensation products are most preferred.

The amount of the nitrogen source included in the foliar fertilizer composition is not critical to the ability of the alpha alkanoic acid derivative to enhance the effect of the foliar fertilizer on yield, and any amount known to those of skill in the art for use in foliar fertilizer compositions can be employed. Normally, the amount employed will vary depending on the phytotoxic effect on the plant foliage, the times of application of the composition to the plant and frequency of such application and the like. In the preferred embodiments of this invention, the quantity of the nitrogen source may vary from about 0.5 to about 50 weight percent N based on the total weight of the composition, and in the particularly preferred embodiments of the invention the quantity of nitrogen source may vary from about 1 to about 35 weight percent on the same basis. In the most preferred embodiments of the invention, the quantity of nitrogen source may vary from about 3 to about 25 on the above-referenced basis.

The fertilizer composition of this invention preferably includes sources of potassium, sulfur and phosphorus. The sources of potassium, sulfur and phosphorus are not critical but are preferably in the form of water soluble salts containing these materials. Illustrative of useful potassium salts are potassium chloride, potassium sulfate, potassium phosphate, potassium carbonate, potassium bicarbonate, potassium nitrate, potassium thiosulfate, potassium bisulfate, potassium polyphosphate, potassium ammonium polyphosphate and the like. Useful sulfur-containing salts include calcium sulfate, potassium sulfate, calcium polysulfate, ammonium sulfate, magnesium sulfate, sodium sulfate, potassium thiosulfate, ammonium thiosulfate magnesium thiosulfate, sodium thiosulfate, zinc thiosulfate, manganese sulfate, iron sulfate, iron thiosulfate, cobalt sulfate, cobalt thiosulfate, cupric thiosulfate, cuprous sulfate and the like. The phosphorus requirements can be satisfied by various phosphate salts such as ammonium or potassium orthophosphates, pyrophosphates, metaphosphates and or higher linear and non-linear polyphosphates. Condensates of sulfur and phosphorus or phosphorus and nitrogen such as phosphoryl triamide, phosphoro nitric heramide and like condensates may also be used. Preferably, some portion of the phosphorus is in the form of a linear polyphosphate, although some orthophosphate and/or pyrophosphate can also be present. In these preferred embodiments, the number of phosphate groups in the polyphosphate will usually range from about 2 to about 10.

The concentrations of these non-nitrogeneous phosphorus, potassium and sulfur plant nutrients are expressed on a $P_2O_5$, $K_2O$ and S weight basis, respectively. In the preferred embodiments, the quantity of phosphorus is at least about 5 to 35 weight percent P (expressed as $P_2O_5$); the quantity of potassium is at least about 0.5 to 30 weight percent (expressed as $K_2O$ by weight) and the quantity of sulfur is at least from about 0.5 to about 10 weight percent (expressed as S by weight). In the particularly preferred embodiments, the weight percent phosphorus may vary from about 1 to about 15 weight percent, the weight percent of potassium may vary from about 1 to about 10, and the weight percent of sulfur may vary from about 1 to about 5, each expressed on the above-referenced basis. Amongst these particularly preferred embodiments, most preferred are those embodiments in which the weight percent of phosphorus may vary from about 1 to about 10, the weight percent of potassium may vary from about 1 to about 5 and the weight percent of sulfur may vary from 1 to 3.

The composition of this invention includes a water component. The amount of water employed is not critical to the unique advantages of the invention and can be varied widely. Water is preferably present in concentrations of up to about 90%, based on total composition weight. The water concentration should be adequate to ensure adequate dispersion of the nutrients and in the preferred embodiments of the invention should be adequate to provide a product that is capable of being stored for reasonable times at the lowest expected ambient temperature, preferably 32° F., without the components salting out of solution to any significant degree. The minimum dilution also aids in the prevention of burning of the plants by a more concentrated solution.

Other micronutrients such as boron, zinc, iron, manganese, copper, molybdenum, cobalt and the like, either individually or in mixtures, may be included in the composition of this invention to correct trace metal deficiencies. Usually these micronutrients are added in the form of aqueous solutions of water soluble salts or complexes of micronutrient trace metals. Suitable water soluble salts include the sulfate, nitrate, halide, carbonate, bicarbonate, bisulfate, phosphate, hydrogen-phosphate, dihydrogen-phosphate, thiosulfate, potassium, ammonium, sodium and the like salts of the aforementioned metals. In addition, various chelating agents can be used to insure water-solubility of the applied trace metals. These chelating agents have two or more atoms, commonly referred to as dentate centers, in the molecule which are capable of forming an ionic or coordinate covalent bond with multivalent metal ions. The compounds are commonly called bidentate or polydentate compounds in reference to the number of dentate groups per molecule. The most common agents have oxygen and/or nitrogen atoms at such centers which are spaced in the molecule to form a 5, 6 or 7 member ring when the multivalent metal ion is bridged across the centers. Such organic compounds thus have at least two dentate centers, i.e., nitrogen or oxygen atoms which are separated by 1 to about 3 carbon atoms. Typical substituents in organic molecules which furnish the oxygen and/or nitrogen centers are aldehyde groups, nitro groups, amide groups, carboxyl groups, ester groups, ketone groups, nitroso groups, hydroxyls, etc.

Examples of chelating agents suitable for use in accordance with the invention are:
citric acid,
ethylenediamine,
mono-sodium citrate,
N-methylethylenediamine,
N-ethyethylenediamine,
N-n-propylenediamine,
N-isopropylethylenediamine,
N-n-butylethylenediamine,
N-N-dimethylethylenediamine,
N,N-diethylethylenediamine,
N,N'-dimethylethylenediamine,
N,N'diethylethylenediamine,
N,N'-di-n-propylethylenediamine,
propylenediamine,
2,2-dimethyl-1,2-diaminoethane,
1,3-dimethyl-2-,3-diaminobutane,
trimethylenediame,
2,2-dimethyl-1,3-diaminopropane,
2-hydroxy-1,3-diaminopropane,
tetramethylenediamine,
pentamethylenediamine,
ethylenediamine-N,N'-dipropionic acid,
N-butylethylenediaminetriacetic acid,
N-cyclohexylethylene-diaminetriacetic acid,
N-hydroxyethylethylenediaminetriacetic acid,
ethylenediaminetetraacetic acid,
trimethylenediaminetetraacetic acid,
tetramethylenediaminetetraacetic acid,
pentamethylenediaminetetraacetic acid,
1,2-diaminocyclohexane-N,N'-tetraacetic acid,
ethylenediamine-N,N'dipropionic-N,N'-diacetic acid,
ethylenediamine-N,N'-tetrapropionic acid,
N-hydroxyethyl-N,N',N''-diethylenetriaminetetraacetic acid,
and diethylenetriaminepentaacetic acid.

The fertilizer composition of this invention may include other optional ingredients to improve the effectiveness of the composition, or to provide other beneficial biological effects. For example, the absorption of the composition by the foliage of plants can be accelerated by incorporation of minor amounts, e.g., from about 0.01 to about 10, preferably from about 0.01 to about 5 weight percent, of a surfactant. In the particularly preferred embodiments of the invention, the amount of surfactant may vary from about 0.05 to about 3 weight percent, and in the most preferred embodiments may vary from about 0.05 to about 1 weight percent. The surfactant improves the spreading of the composition on the foliage to achieve an even coverage and also assists in absorption of the fertilizer into the foliage. Suitable surfactants include cationic, anionic and nonionic types as well as mixtures thereof.

Examples of the cationic surfactants include: fatty amines, e.g., dodecylamine, octadecylamine; alkylarylamines, e.g., dodecyl aniline; fatty amides such as fatty imidazolines, e.g. undecylimidazoline prepared by condensing lauric acid with ethylene diamine, quaternary alkyl and aryl ammonium salts and hydrates, e.g., cetyltriethyl ammonium cetyl sulfate; quaternary ammonium bases of fatty amines of disubstituted diamines, e.g., oleyl methylamino ethylene diethylamine methyl sulfate, and the like.

Examples of useful anionic surfactants include the following: fatty acid glyceride sulfonates and fatty acid sulfonates; e.g., sulfonated cottonseed oil, sulfonated oleic acid sulfonated sperm oil, sulfonated tallow, etc.; sulfonated fatty amides, e.g., sulfonated amide of ricinoleic acid, sodium salt of sulfuric ester of oleyl disobutyl amide, etc.; sulfonated anilides of fats, e.g., sodium salt of sulfuric ester of oleylethyl anilide; amides of aminosulfonic acids, e.g., sodium sulfonate of oleylmethyl tauride; amides from condensation of fatty acid chlorides with amino acids, e.g., sodium salt of oleyl sarcoside; sulfonated aromatic hydrocarbons, e.g., benzene sulfonic, naphthalne sulfonic acids and their ammonium and alkali metal salts, etc.; alkylaryl sulfonates, e.g., dodecylbenzene sulfonates octadecylbenzene sulfonates, and the like.

Illustrative nonionic surfactants include the polyethylene oxide condensates with hydrophobic groups having a reactive hydrogen. The hydrophobic group can have from about 8 to 5 carbon atoms and from 2 to about 15 molecular weights of a hydrophilic group. The hydrophobic group can be selected from a variety of organic compounds having one or more reactive hydrogens including fatty alkyl or alkenyl alcohols, fatty acids, fatty amines, fatty amides, esterified hexitans or alkyl or alkenyl phenols, and the like.

The composition of this invention may also include one or more emulsifying or dispersing agents. The type of dispersing or emulsifying agents employed is not critical, and the choice of such agents and the amount employed is dictated by the nature of the composition and the ability of such agents to facilitate dispersion of the various components of the composition. Generally, it is desirable to use as little of the agents as possible, consistent with the desired dispersion of the various components in the composition so that rain does not re-emulsify the various components after they are applied to foliage of plants and wash them off. Nonionic, anionic, amphoteric or cationic dispersing or emulsifying agents or mixtures thereof can be employed. Illustrative of useful agents are the condensation products of alkylene oxides with phenols and organic acids, alkylarylsulfonates, complex ether alcohols, quaternary ammonium compounds and the like.

The composition of this invention can include various other optional ingredients known to those of skill in the art for inclusion in foliar fertilizer compositions. For example, the effectiveness of the composition can be improved by incorporation of various adjuvants, as for example, humectants, such as molasses, carbowax, propylene glycol, glycerine, lecithin and the like. Also, various pesticides can be incorporated in the composition of this invention to obtain a combined fertilization pesticidal treatment. The pesticides can be herbicides having a selective action for undesired vegetation or tree species or can be insecticides, larvicides, miticides, nematocides and the like. These pesticides can be synthetic or naturally occurring chemicals. In addition, various plant growth regulants other than alphaoximino alkanoic acids can be included in the composition of this invention. Illustrative of useful plant growth regulants are auxins, such as auxins based on the phenoxy alkanoic acid structure, as for example 2,4-dichlorophenoxy acetic acid (2,4-D) and the like; auxins based on the indolealkanoic acid structure, such as indoleacetic acid (IAA) and the like; and auxins base on the napthalenealkanoic acid structure, such as naphthaleneacetic acid (NAA) and the like. The composition may also include cytokinins, such as benzyladenine, kinetin, zeatin and the like; and other plant growth regulants such as triodobenzoic acid, abscissic acid and the like.

The composition of this invention can be conveniently prepared according to the conventional methods known to those of skill in the art and accordingly, will not be described herein in any great detail. Briefly stated, one simple and very convenient method of formulating the composition is merely dissolving selected sources of the desired essential and optional ingredients in appropriate solvent, preferably a nonphytotoxic, one such as water.

The foliar fertilizer composition of this invention are preferably substantially free of undissolved fertilizer solids. However, it is preferred to employ concentrated solutions, and to apply the solutions in the form of a fine mist. Conventional field spraying equipment can be used, including sprayers pulled through the fields by tractors, as well as aerial spraying equipment. While the solution concentrations (as distinguished from the nutrient ratios) are not critical, total solid concentrations on a solids to total solution weight basis can advantageously range from about 30 to about 45% solids. It is advantageous to add a surfactant to the foliar compositions.

The compositions and method of this invention can be used effectively with a wide variety of plants. The method is particularly applicable to the cultivation of soybeans, including both Northern and Southern varieties. However, it can also be applied to other legume field crops which are raised for the production of dry seeds, such as dry beans, dry peas, lentils, chick peas, pigeon peas, peanuts, and cowpeas and as well as to vegetable crops such as tomato, potato, melons, and members of the mustard family such as cabbage and broccoli. The method and composition is also believed to be applicable to the cultivation of field corn (maize) and other cereal grain crops, including sorghum, wheat, oats, barley, rye, millet, and rice, as well as other field crops believed to require nutrient ratios similar to corn for foliar feeding such as rape, sunflowers, safflower and sesame. The composition and method of this invention can also be used with ormanental plants, as for example, plants which produce flowers such as chrysanthemums, orchids and the like; fiber crops as for example, cotton, flax and the like; pasture crops such as grasses, alfalfa and the like; and forest crops as for example soft woods as pine, cedar, hemlock and like conifers, and hardwoods such as oak, teak, and mahogany; and fruit crops such as cherry, almond, citrus, and apple.

Timing of application of the composition of this invention is not critical and the composition can be conveniently applied in plant foliage at anytime from the beginning of the foliage growth stage throughout the growing season. The composition can be applied in a single application or multiple applications can be made if desired.

The rate of application should be such that sufficient composition is applied to the plant to obtain the desired increase in plant yield. The rate of application will depend on a number of factors, such as environmental conditions, type of crop and the like. It has also been found that timing and rate of application bear a relationship to one another and to the crop to which they are applied, such that the rate of application and the timing thereof bear a relationship to the yield increase.

The composition is usually applied at a rate of from about 5 to about 600 pounds of nutrients per acre, in a total applied aqueous volume of from about 3 to about 1500 gallons per acre. In the preferred embodiments of the invention the composition is applied at a rate of from about 2 to about 100 pounds of nutrients per acre in a total applied aqueous volume of from about 6 to about 250 gallons per acre, and in the particularly preferred embodiments at a rate of from about 3 to about 30 pounds per acre in a total volume of from about 9 to about 25 gallons per acre.

An especially effective embodiment of the composition of this invention is as follows:

a. $H_2O$: from about 25% to about 90% (expressed as percent by weight);

b. Urea, ammonium, nitrate and other sources of nitrogen either singly or in any combination: from about 0.5% to about 50%, preferably from about 39% to about 35% (expresed as percent N by weight);

c. Phosphorus: from about 0.5% to about 35%, preferably from about 1% to about 25%, preferably from about 1% to about 25% (expressed as percent $P_2O_5$ by weight);

d. Potassium: from about 0.5% to about 30%, preferably from about 1% to about 10% (expressed as percent $K_2O$ by weight);

e. Sulfur: from about 0.5% to about 10%, preferably from about 1% to about 5% (expressed as percent S by weight);

f. Alpha-oximinoalkanoic acid: from about 0.01% to about 10.0%, preferably from about 0.05% to about 10% (expressed as percent by weight); and g. Other micronutrients such as boron, zinc, iron, manganese and copper: None to nominal amounts as desired.

This composition when used in one preferred method of this invention is applied to the foliage of plants such as fiber, pasture, forest, fruit, legume or cereal crops by a fine spray applicator and results, in most instances, in a significant yield increase at harvest, when applied at the rate of at least 25 pounds aggregate N—$P_2O_5$—$K_2O$—S alpha-oximino alkonoic acid per acre in the following proportions:

| Component | Rate of Application, lbs./Acre |
|---|---|
| Nitrogen (as N) | from about 0.5 to about 50, preferably from about 1 to about 35 |
| Phosphorus (as $P_2O_5$) | from about 0.5 to about 35, preferably from about 1 to about 15 |
| Potassium (as $K_2O$) | from about 0.5 to about 30, preferably from about 1 to about 10 |
| Sulfur (as S) | from about 0.5 to about 10, preferably from about 1 to about 5 |
| Alpha-oximino-alkanoic acid | from about 0.01 to about 10, preferably from about 0.05 to about 2 |

In the presently preferred embodiment, the aggregate rate of application is from about 40 to about 150 pounds of N—S—$P_2O_5$—$K_2O$-alpha-oximinoalkanoic acid compound per acre, preferably from about 40 to about 75 pounds of N—S—$P_2O_5$—$K_2O$-alpha oximino alkanoic acid compound per acre.

The following specific examples are presented to more particularly illustrate the invention.

EXAMPLE I

The effect of combinations of foliar fertilizer and alpha-oximino alkanoic acid compounds on yield of maize (Pioneer variety 3965A) was evaluated in a field trial in New York State. In these trials, an aqueous solutions containing 12% urea (expressed as % nitrogen), 4% of a mixture of ortho, pyro and higher polyphosphates (expressed as % $P_2O_5$), 4% potassium phosphate or sulfate salts (expressed as % $K_2O$), and 0.5% potassium or ammonium sulfate salts (expressed as % S), (hereinafter referred to as "Fertilizer") with and without 0.40% alpha-oximino caproic acid was sprayed on the maize at the rate of 10 gal/acre at the 12-leave stage of development. Another aqueous solution containing 0.40% wt/wt alpha-oximino caproic acid was applied to the maize at the same rate and growth period as the first solution. Each of the aforementioned aqueous solutions included 1% gelatin (wt/wt/) as an additonal ingredient. The relative effects on % yield resulting from application of these solutions are set forth in the following Table I:

TABLE I

| Treatment | % of Control Yield |
|---|---|
| untreated control | 100 |
| alpha-oximino caproic acid alone | 95 |
| Fertilizer alone | 97 |
| Fertilizer + alpha-oximino caproic acid | 114 |

EXAMPLE II

The effect of combinations of foliar fertilizer and alpha-oximino alkanoic acids on yield of soybeans (variety Hodgson) was examined in a field trial in New York. Fertilizer was sprayed (10 gal/acre) with and without alpha-oximino caproic acid (0.40% wt/wt) at the R2 and R4 stage of development. An aqueous solution containing alpha-oximino caproic acid (0.40% wt/wt) was also applied to soybean at the same rate and growth period as the other solutions. Gelatin (1% wt./wt/) was included in all solutions. The relative effects on yield are set forth in the following Table II:

TABLE II

| | % of Control Yield Stage of Development: | |
|---|---|---|
| Treatment | R2 | R4 |
| untreated control | 100 | 100 |
| alpha-oximino caproic acid alone | 79 | 100 |
| Fertilizer alone | 93 | 102 |
| Fertilizer + alpha-oximino caproic acid | 96 | 126 |

EXAMPLES III–XV

Employing the procedures of EXAMPLES I and II other alpha-oximino alkanoic acid compounds may be applied to crop plants to increase crop yields. Representative examples of useful compounds and crop plants whose yield may be increased by application of the composition of this invention are set forth in the following Table III:

TABLE III

| Ex. | Alpha-oximono Alkanoic Acid Compound | Crop Plant |
|---|---|---|
| III | Methyl 6-nitro-2-oximino-hexanoate | Soybean |
| IV | Ethyl 6-nitro-2-oximino-hexanoate | Wheat |
| V | 6-Nitro-2-oximino-hexanamide | Corn |
| VI | 6-Nitro-2-oximino hexanoic acid | Peas |
| VII | 10-Nitro-2-oximino-decanoic acid | Dry Bean |
| VIII | Sodium 6-nitro-2-oximino-hexanoate | Oats |
| IX | 2-Oximinoheptanoic acid | Sorghum |
| X | 2-Oximinodecanoic acid | Sugarcane |
| XI | 2-Oximinododecanoic acid | Rice |
| XII | N,N—Diethyl 6-nitro-2-oximino hexanamide | Cowpeas |
| XIII | Dodecyl 2-oximino decanoate | Soybean |
| XIV | Potassium 10-nitro-2-oximino decanoate | Barley |
| XV | 4-Methyl-2-oximino hexanoic acid | Corn |

What is claimed is:

1. A aqueous foliar fertilizer composition of the type which is applied to the foliage of plants, said composition containing nitrogen, and an effective amount of one or more alpha-oximino alkanoic acids and esters, sulfamides and salt derivatives thereof having the general formula:

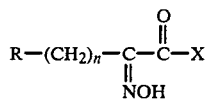

wherein:
n is an integer from 1 to 12;
R is selected from the group consisting of hydrogen, alkyl, cycloalkyl, cycloalkenyl, aralkyl, nitro, alkylaryl, aryl, heterocyclic, alkenyl and alkynyl; and
X is selected from the group consisting of OZ, SZ, NZZ' and OZ", wherein Z and Z' are the same or different and are independently selected from the group consisting of hydrogen, alkyl, cycloalkyl, cycloalkenyl, aralkyl, alkylaryl, aryl, heterocyclic, alkenyl and alkynyl, and wherein Z" is an alkali metal.

2. An aqueous foliar fertilizer composition of the type which is applied to the foliage of plants, said composition containing nitrogen, and an effective amount of one or more alpha-oximino alkanoic acids having the general formula:

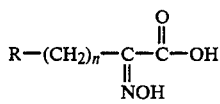

and salt derivatives thereof, wherein:
n is an integer from 1 to 12; and
R is selected from the group consisting of hydrogen, alkyl, cycloalkyl, cycloalkenyl, aralkyl, nitro, alkaryl, aryl, heterocyclic, alkenyl and alkynyl.

3. A composition according to claim 2 wherein n is an integer of from 1 to 6.

4. A composition according to claim 2 wherein R includes not more than 8 carbon atoms.

5. A composition according to claim 2 wherein said one or more sources of nitrogen are selected from the group consisting of urea, water-soluble urea and formldehyde condensation products, ammonium salts, and nitrate salts.

6. A composition according to claim 5 wherein said source of nitrogen is urea, ammonium salts, nitrate salt or a combination thereof.

7. A composition according to claim 6 wherein said source of nitrogen is urea.

8. A composition according to claim 2 wherein the amount of said alpha-oximino alkanoic acids and derivatives thereof is equal to or greater than about 0.01 weight percent based on the total weight of the composition.

9. A composition according to claim 8 wherein said amount of said alpha-oximinoalkanoic acids and derivatives thereof is from about 0.01% to about 10% weight percent based on the total weight of the composition.

10. A composition according to claim 9 wherein said amount is from about 0.05 to about 2 weight percent.

11. A composition according to claim 10 wherein said amount is from about 0.1 to about 1.0 weight percent.

12. A composition according to claim 2 wherein:
R is selected from the group consisting of nitro, hydrogen, alkyl having from 1 to about 12 carbon atoms, cycloalkyl having from about 3 to about 12 carbon atoms, alkenyl having from about 3 to about 12 carbon atoms, and alkynyl having from about 3 to about 12 carbon atoms.

13. A composition according to claim 2 wherein
n is from 1 to 8; and
R is alkyl or nitro.

14. A composition according to claim 13 wherein said alpha-oximino alkanoic acids and derivatives thereof are selected from the group consisting of methyl 6-nitro-2-oximinohexanoate, 6-nitro-2-oximinohexanamide, 6-nitro-2-oximino hexanoic acid, 2-oximino hexanoic acid and ethyl 6-nitro-2-oximinohexanoate.

15. A composition according to claim 14 wherein the alpha-oximino alkanoic acid is 2-oximinohexanoic acid or 6-nitro-2-oximinohexanoic acid.

16. A composition according to claim 2 capable of being applied as a foliar spray fertilizer, said composition comprising a solution of the following constituents:
a. $H_2O$: from about 25 to about 90% (by weight);
b. Nitrogen: from about 0.5% to about 50% (nitrogen by weight);
c. Phosphorous: from about 0.5% to about 35% ($P_2O_5$ by weight);
d. Potassium: from about 0.5% to about 30% ($K_2O$ by weight);
e. Sulfur: from about 0.5% to about 10% (S by weight);
f. Alpha-oximino alkanoic acid: from about 0.1% to about 10% (by weight); and
g. At least one micronutrient selected from the group consisting of boron, zinc, iron, manganese and copper present in nominal amount.

17. The composition of claim 2, including a minor and effective amount of phosphorus.

18. The composition of claim 2, including a minor and effective amount of sulfur.

19. The composition of claim 2, including a minor and effective amount of potassium.

20. The composition of claim 2, including a minor and effective amount of micronutrients.

21. A method of increasing the yield of field plants which comprises treating the foliage of said plants with the compositions of claim 2 at a rate of about 5 to about 600 pounds of nitrogen per acre in a total applied aqueous volume of from about 3 to about 1500 gallons of per acre.

22. A method according to claim 21 wherein said plant is a field crop.

23. A method according to claim 22 wherein said field crop is a legume grain crop or a cereal grain crop.

24. A method according to claim 23 wherein said field crop is a legume grain crop.

25. A method according to claim 24 wherein said crop is soybean.

26. A method according to claim 22 wherein said field crop is a cereal grain crop.

27. A method according to claim 26 wherein said cereal grain crop is selected from the group consisting of corn and wheat.

28. A method according to claim 27 wherein said crop is corn.

* * * * *